(12) United States Patent
Bonnet et al.

(10) Patent No.: US 7,684,019 B2
(45) Date of Patent: Mar. 23, 2010

(54) METHOD AND DEVICE FOR MEASURING DISTANCE

(75) Inventors: Gerhard Bonnet, Mannheim (DE); Leonid P. Yatsenko, Kiev (UA); Bruce W. Shore, Livermore, CA (US); Klaas Bergmann, Kaiserslautern (DE)

(73) Assignee: Spheron VR AG, Waldfischbach-Burgalben (DE)

( * ) Notice: Subject to any disclaimer, the term of this patent is extended or adjusted under 35 U.S.C. 154(b) by 655 days.

(21) Appl. No.: 10/501,842

(22) PCT Filed: Jan. 16, 2003

(86) PCT No.: PCT/DE03/00106

§ 371 (c)(1),
(2), (4) Date: Jan. 18, 2005

(87) PCT Pub. No.: WO03/061084

PCT Pub. Date: Jul. 24, 2003

(65) Prior Publication Data

US 2005/0117160 A1    Jun. 2, 2005

(30) Foreign Application Priority Data

Jan. 19, 2002  (DE) ................................. 102 04 879

(51) Int. Cl.
*G01C 3/08* (2006.01)
(52) U.S. Cl. ........................ 356/5.03; 356/5.01; 356/28
(58) Field of Classification Search ................ 356/4.07, 356/5.01, 5.03, 28
See application file for complete search history.

(56) References Cited

U.S. PATENT DOCUMENTS

| | | | | |
|---|---|---|---|---|
| 4,579,417 | A | 4/1986 | Ih | 350/96.11 |
| 5,394,238 | A * | 2/1995 | Mocker et al. | 356/342 |
| 5,592,237 | A * | 1/1997 | Greenway et al. | 348/716 |
| 5,592,327 | A * | 1/1997 | Gabl et al. | 359/348 |
| 5,740,704 | A * | 4/1998 | Payne | 81/60 |
| 5,835,199 | A * | 11/1998 | Phillips et al. | 356/5.03 |
| 5,955,992 | A * | 9/1999 | Shattil | 342/375 |
| 5,991,317 | A * | 11/1999 | Nighan et al. | 372/22 |
| 6,147,779 | A | 11/2000 | Bolton et al. | |
| 6,570,704 | B2 * | 5/2003 | Palese | 359/349 |
| 6,594,061 | B2 | 7/2003 | Huang et al. | |
| 6,603,537 | B1 | 8/2003 | Dietz et al. | |

(Continued)

FOREIGN PATENT DOCUMENTS

DE    10045535    4/2002

(Continued)

OTHER PUBLICATIONS

"Optical frequency domain ranging by a frequency-shifted feedback laser", Nakamura, K.; Hara, T.; Yoshida, M.; Miyahara, T.; Ito, H.;IEEE Journal of Quantum Electronics, vol. 36, Issue 3, Mar. 2000 pp. 305-316.*

(Continued)

*Primary Examiner*—Thomas H Tarcza
*Assistant Examiner*—Timothy A Brainard
(74) *Attorney, Agent, or Firm*—Baker & Daniels LLP

(57) ABSTRACT

The invention relates to a frequency-shifted feedback radiation source, equipped with an element for increasing the beat intensity of the emission frequency component.

24 Claims, 7 Drawing Sheets

U.S. PATENT DOCUMENTS

Figure 1:
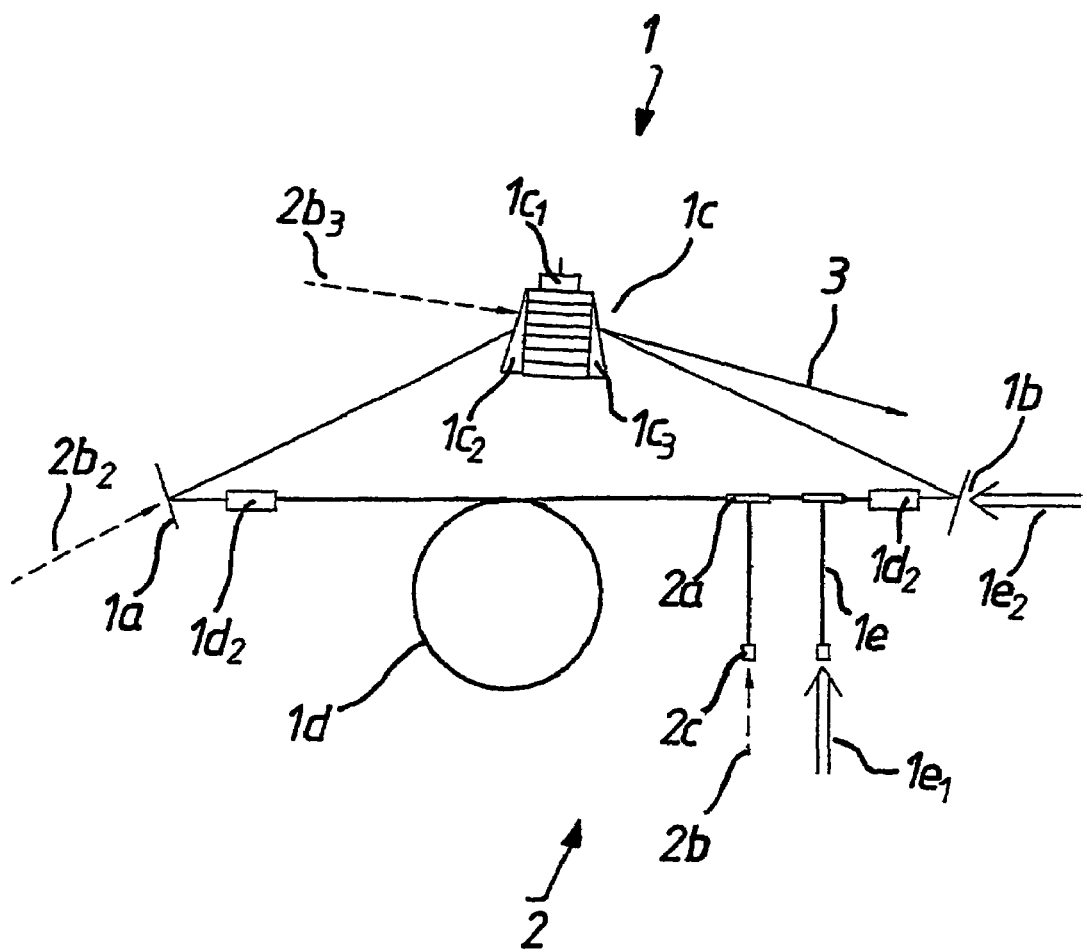

| | | | |
|---|---|---|---|
| 6,856,723 B1 * | 2/2005 | Ito et al. | 385/27 |
| 7,061,620 B2 | 6/2006 | Bonnet | |
| 2003/0184760 A1 | 10/2003 | Bonnet | 356/489 |
| 2004/0257266 A1 | 12/2004 | Pleva et al. | |
| 2005/0078296 A1 | 4/2005 | Bonnet | |

FOREIGN PATENT DOCUMENTS

| | | |
|---|---|---|
| EP | 1 258 718 | 11/2000 |
| JP | 05232540 | 9/1993 |
| JP | 05322699 | 12/1993 |
| JP | 10082858 | 3/1998 |
| JP | 2000081374 | 3/2000 |
| JP | 2002005614 | 1/2002 |
| WO | WO 01/61302 | 8/2001 |
| WO | 02/23120 | 3/2002 |

OTHER PUBLICATIONS

Nakamura, Koichiro et al., "A New Technique of Optical Ranging by a Frequency-Shifted Feedback Laser", IEEE Photonics Technology Letters, vol. 10, No. 12, Dec. 1998.

Nakamura, Koichiro et al., "Observation of a highly phase-correlated chirped frequency comb output from a frequency-shifted feedback laser", Applied Physics Letters, vol. 72, No. 21, May 25, 1998.

Kowalski, F.V., et al., "Broadband continuous-wave laser", Optics Letters, vol. 13, No. 8, Aug. 1988.

Hale, Paul D. et al., "Output Characterization of a Frequency Shifted Feedback Laser: Theory and Experiment", IEEE Journal of Quantum Electronics, vol. 26, No. 10, Oct. 1990.

Nakamura, Koichiro et al., "Spectral Characteristics of an All Solid[State Frequency-Shifted Feedback Laser", IEEE Journal of Quantum Electronics, vol. 33, No. 1, Jan. 1997.

Littler, Ian C.M., et al., "The cw modeless laser: spectral control, performance data and build-up dynamics", Optics Communications 88, 1992.

Balle, Stefan et al., "Frequency shifted feedback dye laser operating at a small shift frequency", Optics Communications 102 (1993).

Bonnet, G., et al., "Dynamics and self-modelocking of a titanium-sapphire laser with intracavity frequency shifted feedback", Optics Communications 123 (1996).

(*) English language abstract only.

* cited by examiner

METHOD AND DEVICE FOR MEASURING DISTANCE

This invention concerns the general claimed device and thereby deals with the frequency shifted feedback emission sources and their use in measuring distance.

Techniques of measuring distances optically have been familiar for a long time. Besides echo sounding measurements, in which short light pulses are transmitted and the time elapsed until the backscattered or reflected pulse is measured, other familiar techniques involve interferometric processes.

An interferometric process entails splitting a light beam into a reference light beam and an object light beam. The object light beam is irradiated onto an object and reflected back from the object. The reference light beam and the object light beam are then superimposed on a light sensor and the distance to the object is derived from the superimposed signal. According to the configuration, this procedure produces very precise measurements; however, the depth measurement of extended objects at different locations creates difficulties.

Performing distance measurements with frequency deviation feedback lasers and frequency shifted feedback lasers (FSF laser) is also known. Examples of the FSF laser are to be found in the writings of F. V. Kowalski, P. D. Hale and S. J. Shattil.

"Broadband continuous-wave lasers," Opt. Lett. 13, 622 (1988), and P. D. Hale and F. V. Kowalski "Output characteristics of a frequency shifted feedback laser: theory and experiment" IEE J. Quantum Electron. 26, 1845 (1990) as well as K. NAKAMURA, T. MIYAHARA, M. YOSHIDA, T. HARA and H. ITO "A new technique of optical ranging by a frequency-shifted feedback laser," IEEE Photonics Technology Letters, Volume 10, 1998 Pages 1772 pp. An example of the application of such a laser for distance measurement is described in detail in the article "Obervation of a highly phase-correlated chirped frequency comb output from a frequency-shifted feedback laser" by K. NAKAMURA, T. MIYAHARA and H. ITO, Applied Physics Letters, Volume 72, No. 21, pages 2631 pp. and in the article "Spectral Characteristics of an All Solid-State Frequency-Shifted Feedback Laser" by K. NAKAMURA, F. ABE, K. KASAHARA, T. HARA, M. SATO and H. ITO in IEEE-JOURNAL OF QUANTUM ELECTRONICS, Volume 33, pages 103 pp. Also refer to I. C. M. Littler, S. Balle and K. Bergmann "The cw modeless laser: spectral control, performance data and build-up dynamics" Opt. Commun. 88, 514 (1992) and S. Balle, F. V. Kowalski and K. Bergmann "Frequency shifted feedback dye laser operating at small frequency shift" Opt. Commun. 102, 166 (1993) and G. Bonnet, S. Balle, Th. Kraft and K. Bergmann "Dynamics and self-modelocking of a Titanium-Sapphire laser with intracvacity[sic] frequency shift" Opt. Commun. 123, 790 (1996). The three latter documents expand on FSF lasers according to the current state of technology. These documents are also comprehensively categorized by reference in DE 100 45 535 for purposes of disclosure.

The principle of distance measurement with an FSF laser, which also contains an acousto-optical modulator in its resonator, in addition to an amplification medium, may be briefly presented as follows: amplification of light from the light waves entering into the amplification medium occurs for each frequency in which the amplification is greater than 1. For all other frequencies the light is diminished as usual. The optical resonator now has preferred frequencies, similar to a vibrating string, so-called resonator modes. Each resonator mode has a specific frequency, i.e. it corresponds to light of a precisely specified wavelength. Each resonator mode, in which the amplification of the amplifying medium is greater than 1, will now be emitted as a preference.

This is principally the behavior of a laser without an acousto-optical modulator. If the acousto-optical modulator now becomes excited, the material oscillations create a moving grid that varies in its density at various places; the light traveling around in the resonator is diffracted at this density grid, whereby an interaction of the light photons with the phonons characterizing the density oscillations of the acousto-optical modulator occurs, which shifts the frequency of the diffracted light by the excitation frequency of the acousto-optical modulator. This leads to the laser modes shifting in time in frequency, changing the frequency of a mode in time; when there is more than one mode, this also applies to all modes that are oscillating in the resonator. This means, however, that according to the extent the amplification 1 of the amplification profile runs, the intensities of the individual oscillating modes are different and that the mode intensity changes with the frequency. It is makes sense that the frequencies change for all modes equally with time. In other words, light that is emitted at different times will possess different frequencies.

Light beams that are irradiated over optical paths of varying length now flow to a location similar to a detector, i.e. they were also emitted at different times from the laser, so there must be a frequency difference between the two. This frequency difference can be detected as a beat frequency on a photo-sensitive element. The length of distance traveled can be determined from the beat frequency.

The familiar measuring set-up is described in the documents referred to above.

In practice, it has been shown that the signals at the measuring receiver are strongly degraded by a high noise level. If the distance that is to be determined is fixed, a single sharp line without noise in the beat frequency would be observed. In reality, however, it turns out that instead that a very broad structure instead of a sharp line is obtained with FSF lasers, which severely impairs the quality of the obtained measurement.

It is desirable to change the known setups and processes in such a way that the applicability can be increased.

The task of this invention is to make something new available for commercial application.

Claims for the solution to this task are made in independent form. This invention proposes a frequency shifted feedback emission source that uses a means for increasing emission frequency component beat intensity.

Accordingly, it was not only recognized that the prevailing assumption in the interpretation of the state of technology that the beat portions coming from individual modes of the frequency shifted lasers would add up is not correct; rather, they interfere destructively. Surprisingly, the signal that can be achieved in the current state of technology with FSF lasers rests on the fact that noise in the operation of the known lasers, i.e. occurrence of fluctuation of intensity and/or phase, which prevents the occurrence of a—theoretically awaiting more exact analysis—completely destructive interference of the frequency components that are coherent to one another, as would otherwise occur. Noise caused by measurements using FSF lasers, according to the current state of technology, conditional noise accordingly appears not to be a consequence of the noise of the laser; rather, it is the actual measurement signals themselves that are caused by the noise of the laser, i.e., its inherent fluctuations.

Based on this knowledge it is now not only proposed that the emitter be equipped with means to increase the intensity of the beat vibration of frequency components of the emitted beam, but it is also specified how this knowledge can better be used to improve locally resolved object distance measurement.

In a preferred variation, the means for increasing emission frequency component beat intensity is configured as a means for increasing non-stochastic emission frequency component beat intensity, the means will therefore condition an intensity increase brought about by spontaneous emission, in particular in the amplification medium.

Typically an injection light source is used that injects light into the emitter, i.e. provides a seed emission field there. As an alternative, it would also be possible to interfere with complete destructive interference of frequency components via the measurement conditioned by spontaneous emission in the stationary operating condition by modulating the pump light somewhat, which is typically less preferred due to the level duration, etc. or by bringing about a somewhat fast loss mechanism in the amplification medium itself. The presence of an injection light source, however, is especially advantageous because it is an easy to build option through which a number of advantageous configurations can be realized.

A particularly advantageous variation for an injection light source is an injection laser. The emission of the laser can be guided into the resonator, in particular, in and/or to the amplification medium of the frequency shifted feedback emitter.

It is preferred when the injection light source emits light at a wavelength that is close to the wavelength at which the amplification of the amplification medium of the frequency shifted feedback emitter is at 1; it may optionally be irradiated close to the upper and/or lower threshold wavelength. The frequency of the injected light emission will typically be within the range in which the amplification G is greater than 1 and not outside of that range. For seed radiation injected very close to the threshold, and, particularly, modulation of the same, this threshold may temporarily be exceeded. It would always be preferable to select the irradiation frequency in such a way that amplification occurs no later than after a few resonator revolutions.

It is preferred when the injection light source emits narrowband irradiation whereby the narrowband radiation is incorporated into the amplification bandwidth of the amplification medium of the frequency shifted feedback emitter. In this instance, narrowband can refer to a bandwidth no greater than 5%, preferably not over 1% of the amplification bandwidth. In a particularly preferred variation, a single-mode injection laser with a precisely defined, modulating frequency and/or amplitude can be used for the injection.

The injection light irradiation preferably varies with regard to intensity and/or phase. This variation can occur due to a regular modulation, i.e. modulation of intensity and/or phase subject to preset principle moderation or limitations, which do not necessarily need to be uniform.

It is especially preferred when the modulation is not constant but when the intensity and/or the phase of the modulation of the injection light emission varies with time, which occurs best in a periodic manner. It is especially preferred when the frequency of the intensity modulation is changed within specified intervals because a linear variation of the modulation frequency of the injection light emission significantly simplifies an assessment of received beat vibration signals for measuring distance.

When a modulation of the emission emitting from the injection light source with respect to phase and/or intensity is performed, it is preferred when the frequency of this modulation lies close to the frequency occurring from the so-called chirp rate and the distance that is determined with the emission source immediately. The chirp rate is provided by the frequency of the acousto-optical or other modulator within the frequency shifted feedback emission source referring to the revolution period of the emission in the resonator of this source.

It may be mentioned that the emission source is typically a frequency shifted feedback laser. This may work in particular in infrared ranges that are safe to the eye. The wavelength ranges that are technologically well open and particularly cost-efficient for telecommunications devices may also be used for purposes of this invention, which opens the possibility of accessing cost-effective available elements for designing configurations and devices.

It can be seen that the described emission source used in the invention can be used in a configuration to measure distance. Beam expansion optics can be used, which expand the irradiation from the frequency shifted feedback emission source so wide that the surface to be investigated is illuminated broadly on and off and a means is then used to gain height profile information from the backscattering from the surface directly. Alternatively or additionally it is possible to irradiation partial ranges of the object and gain information about distances.

Figure 2:
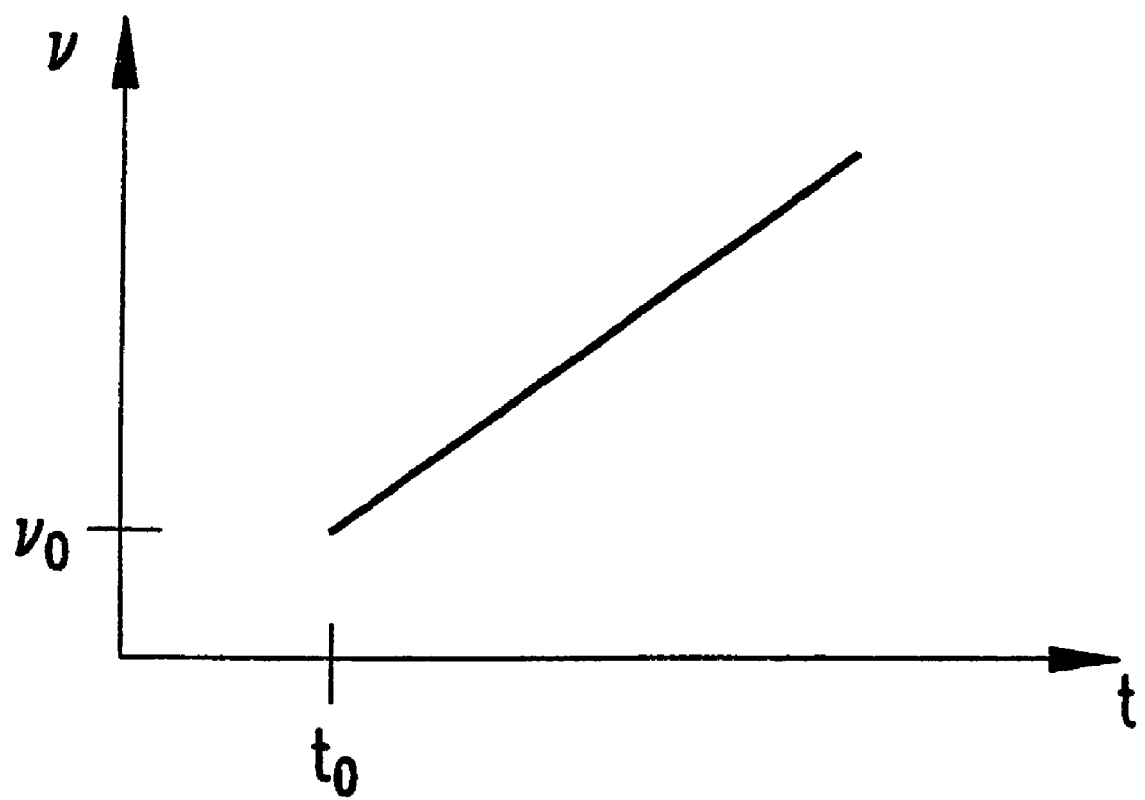
Figure 3:
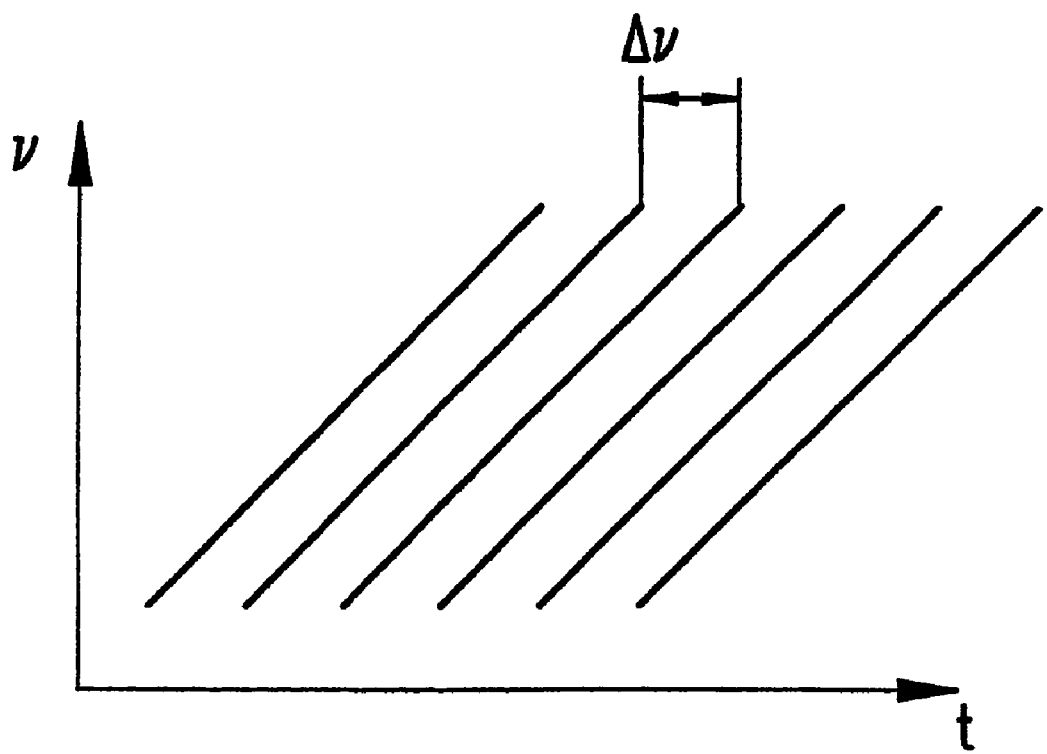
Figure 4:
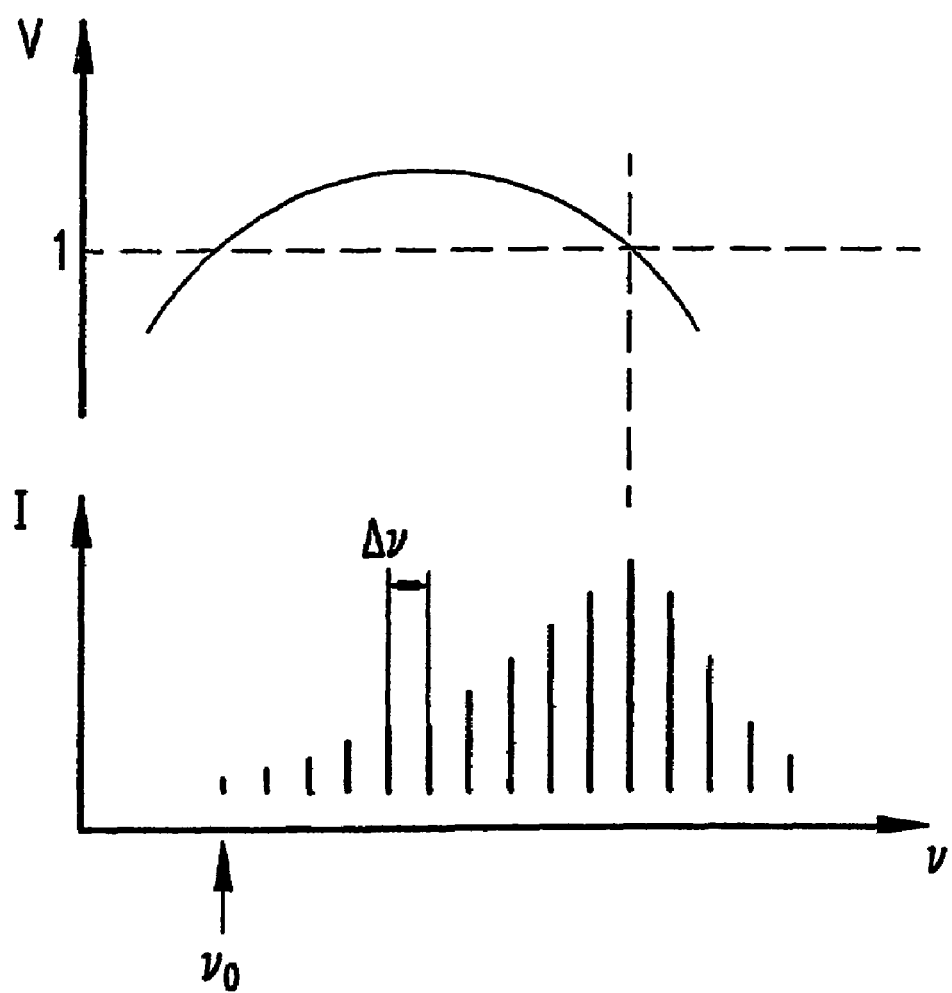
Figure 5:
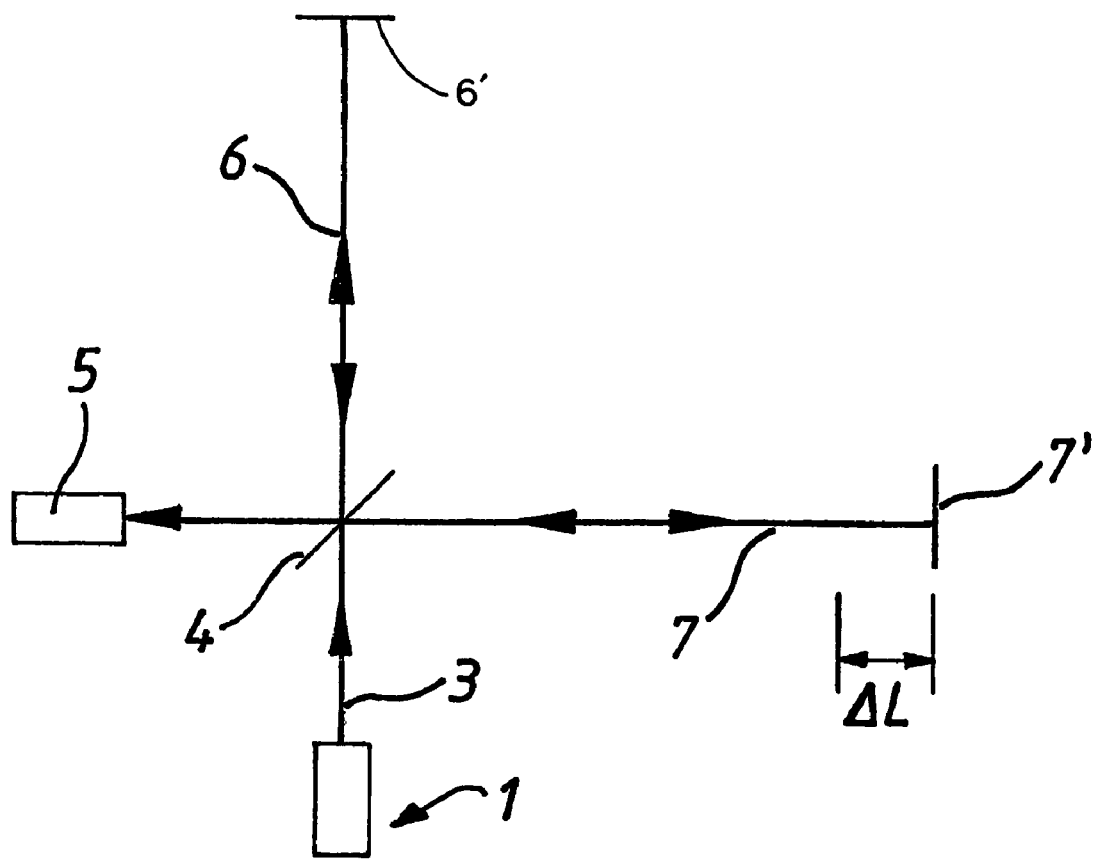
Figure 6:
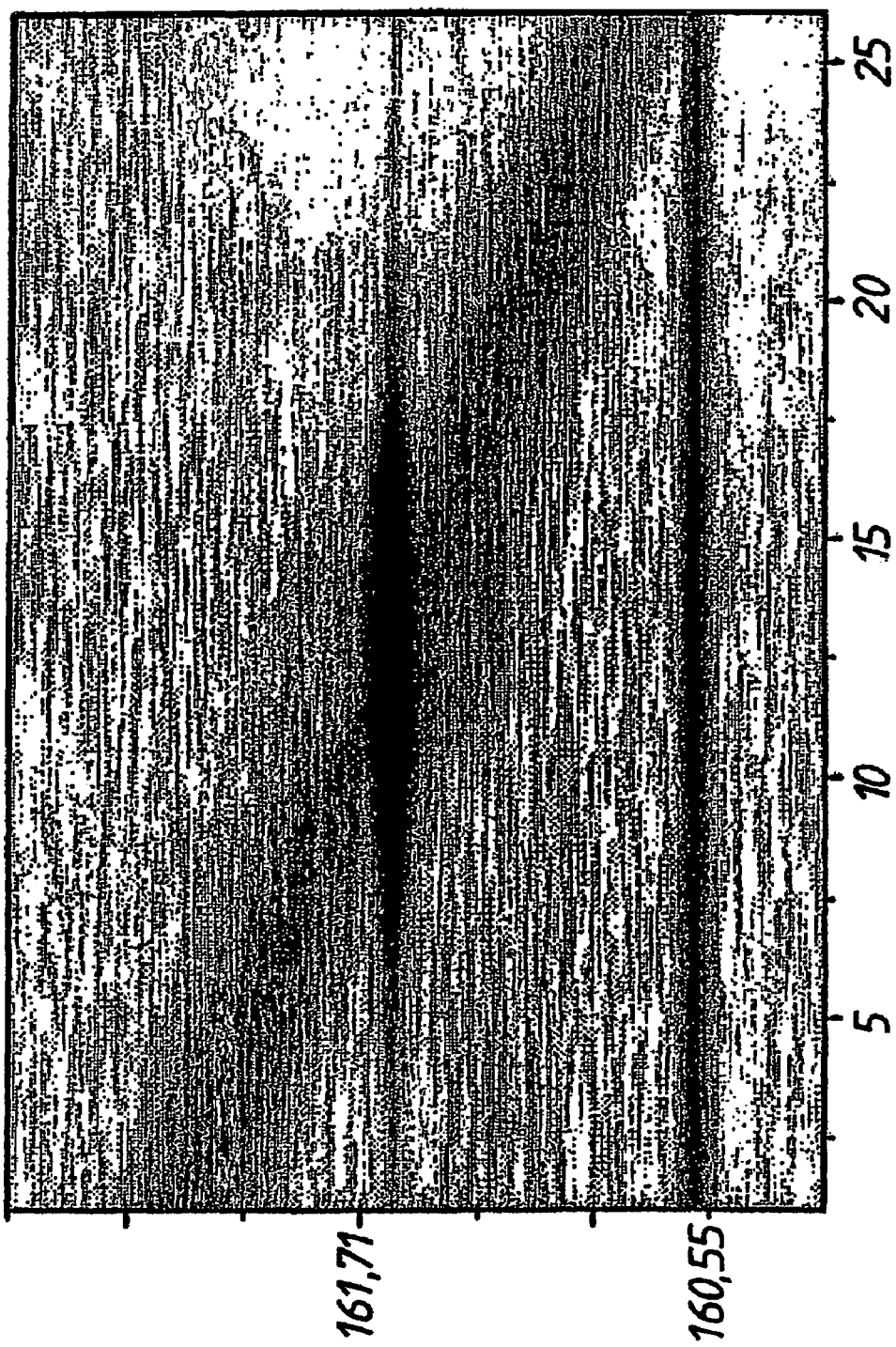
Figure 7:
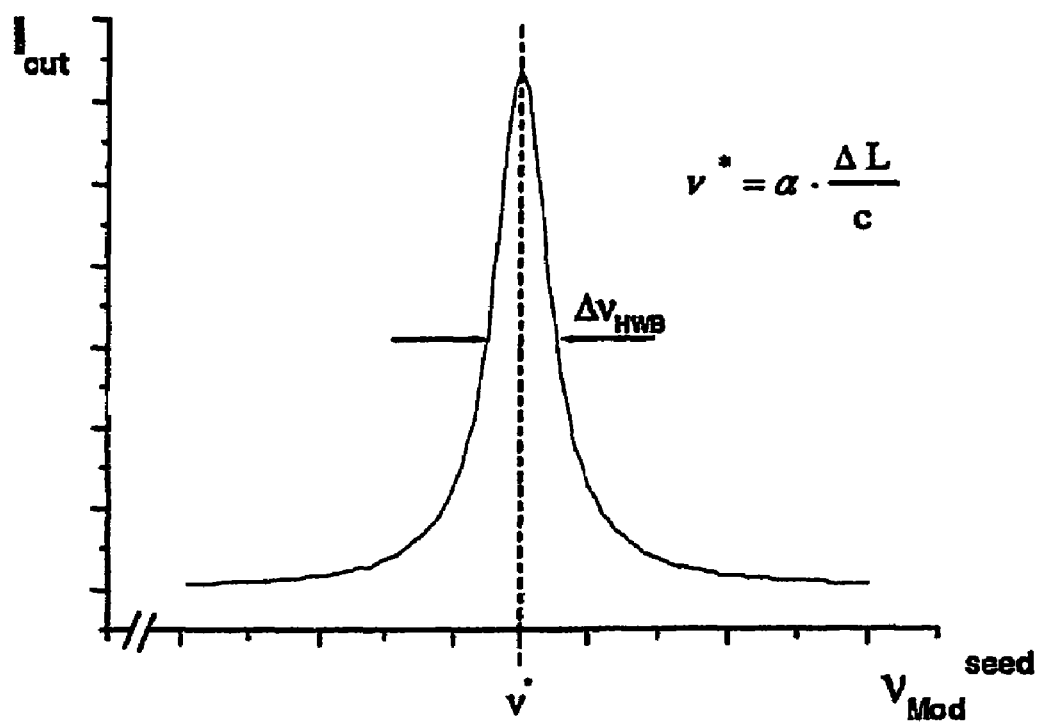

The invention will now be described in the following as examples using illustrations. These illustrations show:

FIG. 1 a schematic design of a frequency shifted feedback emission source that conforms to the in;

FIG. 2 the frequency variation of a single laser mode when using a linear chirp over time;

FIG. 3 the synchronous variation of all components (modes) of an emission light source with frequency shifted feedback conforming to the invention;

FIG. 4 the frequency spectrum of an FSF laser for the given amplification curve (top of image);

FIG. 5 a schematic design for a distance measurement with a configuration that conforms to the invention;

FIG. 6 a grayscale display of a beat frequency spectrum, as can be achieved from the current state of technology, with an artifact structures that are independent of position and a weak measurement signal that is recognizable as stripes running diagonally through the image;

FIG. 7 an example of a beat frequency signal dependent on a seed emission frequency modulation.

As shown in FIG. 1 a general frequency shifted feedback emission source 1 includes a means 2 for increasing emission frequency component beat intensity.

The frequency shifted feedback emission source 1 in this example is a ring laser with frequency shifted feedback. The ring resonator of the ring laser 1 is formed through two high reflecting mirrors $1a$, $1b$ and an acousto-optical modulator $1c$ to which a piezo element $1c1$ as an actuator and input and outputs prisms $1c2$, $1c3$ are arranged and then configured in the resonator ring in such a way that the zeroed diffraction order, displayed as a beam 3 that can be coupled out while the first diffraction order guides the light circulating in the resonator. The acousto-optical modulator $1c$ is selected in such a way that the diffractions efficients of more than 90% result for the first diffraction order frequency shifted in the familiar way through the acousto-optical modulation. The geometry is also selected in such a way that the prisms $1c2$, $1c3$ arranged on the acousto-optical modulator $1c$ are compensated with regard to their dispersion and is still possible in a compact design.

A fiber medium $1d$ is configured between both high-reflecting mirrors $1a$ and $1b$ to which a fiber launch and catcher optics $1d1$ and $1d2$ are arranged. Energy from a point laser designed here as a diode laser (not shown) is irradiated into the fiber so that it can be used as an amplification medium. The launch occurs on a fiber coupler $1e$. The displayed fiber is a traditional ytterbium fiber with a large useable amplification bandwidth of at least 70 nm, in this example, in the spectral range around 1.2 μm; such elements are easily available from the area of optical telecommunications, exactly like other, equally applicable configurations, for example, fiber lasers on the basis of YAG at 1.06 μm with a few m of bandwidth or erbium of 1.5 μm could be used.

The configuration of the FSF laser, as it has been described up to this point, is essentially traditional. Means for increasing emission frequency component beat intensity will be used. For that purpose there is a fiber coupler 2a that is used to couple injection light into the fiber, indicated in 2b, using a launch optic 2c. The injection light 2b comes from an injection laser (not shown) that with regard to its amplitude and the phase of the optical carrier can be modulated in a temporally variable manner. The injection or seed laser emits radiation whose wavelength lies up close to the lower position G=1 of the amplification profile of the FSF ring laser 1 or the fiber 1d displayed for the up-chirp, compare FIG. 4, where in the upper portion of the image the amplification profile is illustrated as running lines, together with the amplification threshold 1, which is drawn horizontally and whereby the optical carrier frequency of the seed laser is entered as a vertical, hash line.

It can be mentioned at the same time that instead of, and/or besides, a launch via a fiber coupler 2a, a launch of an injection light beam through one of the high-reflecting mirrors would also be possible, as indicated with mirror 1a through beam 2b2, and/or a launch could occur into the acousto-optical modulator, as indicated by arrow 2b3. For the sake of completeness, it is also indicated here that the pump light that is different in this instance from the injection light, indicated with 1e1, can not only be launched via a fiber coupler into the amplifying fiber 1d from the pump light beam 1e1, but, for example, a pump light launch is possible via the high-reflecting mirror as indicated by the beam 1e2 close to the mirror 1b.

This configuration is operated as follows:

A pump light is irradiated on the fiber 1d to bring about an inversion that makes laser operation possible. Then the piezo driver 1c1 of the acousto-optical modulator begins to oscillate so that the ring of the frequency shifted feedback laser is closed. Light that is now emitted from the fiber can now run over the mirror 1a, through the prism 1c2 and the acousto-optical modulator 1c1 and the prism 1c3. The major portion of this light will thereby irradiated into the fiber 1d corresponding to the high diffraction efficiency of the acousto-optical modulator linked to the mirror 1b1.

When passing through the acousto-optical modulator 1c, the frequency of the light changes simultaneously. The light that has run in the direction to the acousto-optical modulator with a preset frequency at the mirror 1a, will therefore strike at the other high-reflecting mirror 1b with a shifted frequency or wavelength. This light with shifted frequency is amplified in the fiber 1d, runs again over the mirror 1a under further frequency shifting through the acousto-optical modulator 1c to the mirror 1b, etc. This leads to the shifting of the frequency upon each pass. The speed used to change the frequency depends on the time it takes for the light to make a pass and how strong the frequency shift in the acousto-optical modulator is. The shift occurs for all components or modes that can be amplified in the resonator in the same way so that the frequency comb represented by the modes of the FSF laser are gradually shifted in a synchronous manner. There is a so-called "chirp." This is displayed in FIG. 3, whereas FIG. 2 displays the variation of the frequency for a given linear chirp. the mirror 1b, etc. This leads to the shifting of the frequency upon each pass. The speed used to change the frequency depends on the time it takes for the light to make a pass and how strong the frequency shift in the acousto-optical modulator is. The shift occurs for all components or modes that can be amplified in the resonator in the same way so that the frequency comb represented by the modes of the FSF laser are gradually shifted in a synchronous manner. There is a so-called "chirp." This is displayed in FIG. 3, whereas FIG. 2 displays the variation of the frequency for a given linear chirp.

This light is now used to measure distances. This will only be discussed in principle first for a not yet locally resolved interferometer configuration, as displayed in FIG. 5, in which the invention light source 1, a beam segmenting element 4 in the catcher beam 3 of the light source 1, a reference path 6 to a reference surface 6' and measurement path 7 to a measurement object 7' are displayed, whereby the beams from the reference object 6' and from the measurement object 7' are guided to a detector 5.

The situation that arises in such a configuration for taking the seed source into operation on the detector, can be seen in image 6. A grayscale display of the beat frequency spectrum is displayed for a laser configuration as a function of the path difference ΔL of the arms 6 and 7 of the measurement configuration. In the grayscale display, the lines can be seen that are position-independent and do not vary with the path difference ΔL and thereby run horizontally in the image; the lines are conditioned by a standing wave portion in the acousto-optical modulator and repeat themselves after the resonator pass run time.

Further, it can be seen that the actual measurement signal has strong noise interference, which runs diagonally as a dark stripe through the image.

Now the injection light source is taken into operation and with a carrier frequency close to the lower range of the amplification curve, i.e. just still inside that range, in which the amplification is greater than 1. The optical carrier frequency that is drawn vertically is modulated, and amplitude modulated in this example, whereby the modulation itself is also not constant, but varies with a frequency that is nearly determined from the so-called chirp rate, i.e. the frequency shift per resonator pass divided by the resonator pass time and is further determined by the light run time along the path difference ΔL between the measurement beam path and the reference beam path as in the design of FIG. 5. The modulation frequency of the injection light is therefore not held constant, but varies around this so-called signature value, i.e. around the value this results from the chirp rate and ΔL through the formula $$\Delta v = \alpha \times \Delta L \times c^{-1}$$

whereby c is the light speed. The modulation frequency is changed around this signature frequency and is preferred in a linear saw tooth form. An intensity is yielded at the detector, as is displayed in FIG. 7. It turns out that a very significantly manifested, sharp intensity peak of the beat signal can be obtained, i.e. the signal is degraded very little from noise and in particular shows a minor degree of noise and thereby a more precise measurement than has been possible up to this point in the current state of technology. It is significant that the injection emission modulation and the beat frequency intensity are tightly linked to one another and a beat frequency intensity maximum is then achieved when the injection modulation frequency corresponds to the frequency expected for a given path difference taking the chirp rate into account.

Presently this is justified as follows: Through the injection of the irradiation of the injection laser at the edge of the amplification range, modes are shifted in the resonator in steps $\Delta v_{AOM}$ over the entire amplification bandwidth so that the laser does not end up in a stationary, practically noise-free equilibrium at which it otherwise would sink. Accordingly, it seems that the traditional image of the coming into position of the beat spectrum is incorrect and actually in a noise-free instance the intensity of a beat would disappear.

In can now be determined that the structure width of the received signal structure is determined by the amplification bandwidth, i.e. a high bandwidth of the emission light source with the frequency shifted feedback, i.e. of the FSF laser, leads to a good spatial resolution. Because additionally the distance measurement precision is essentially determined by the chirp magnitude, it is desirable to select a large frequency shift through the acousto-optical modulator and a small laser resonator length of the FSF laser resonator.

It can be determined that during a distance measurement and, if necessary, during successive distance measurements at a specific time interval, a very high degree of precision can be achieved even during speed and/or acceleration measurements that essentially only depend on the driver frequency consistency of the acousto-optical modulator, as well as the laser resonator length stability during the measurement time. In addition, only magnitudes such as the precision of the beat frequency determination need to be taken into consideration. It is evident that systematic resolutions and precisions of $10^{-6}$-$10^{-8}$ can be achieved. Through the significantly improved signal noise ratio it is also possible to perform measurements using very low power levels because only a high frequency portion in the detected signal must be detected as a beat and this portion consists of familiar or nearly familiar frequencies.

The invention claimed is:

1. A frequency shifted laser radiation source for distance measurements, comprising:
 a frequency shifted feedback laser resonator having a pumped gain medium therein with a gain greater than unity so as to emit laser light having a plurality of frequency components changing with time in a chirping manner;
 a means for splitting said emitted laser light having said plurality of frequency components changing with time in a chirping manner into an object beam for irradiating an object and a reference beam;
 the emitted laser radiation being usable for determinations of distances of objects when using an object detection sensor which receives laser light radiation coming back from an object illuminated with the object beam light and being at a distance to be determined and which object detection sensor also receives said reference beam via a reference path not including the object in such a manner that the laser light radiation coming back from the object and the reference beam interfere with one another, said interference producing a signal by the beating of the plurality of frequency components that change with time in a chirping manner and which are comprised in laser light radiation coming back from said object illuminated with the object beam beating with the plurality of frequency components that change with time in a chirping manner and which are further comprised in the reference beam received at the sensor via said reference path not including the object said beat signal having a signal intensity allowing for the determination of the distance of the object in response to the intensity of the signal;
 wherein the frequency shifted feedback laser radiation source further comprises a means for injection of narrow banded, non-pumping, modulated seed laser light into the frequency shifted feedback resonator, said means for injection modulating the seed laser light such that said intensity of said beat signal is increased.

2. The laser radiation source according to claim 1, wherein the seed laser light is phase modulated.

3. The laser radiation source according to claim 1, wherein the seed light has a wavelength close to the wavelength where the gain of the pumped gain medium is unity so that amplification of the seed laser light occurs at latest after a few resonator round trips.

4. The laser radiation source according to claim 1, wherein the seed laser light is modulated around a signature frequency of $$\delta v = \alpha \times c \times \delta_1,$$

wherein
$\alpha$=chirp rate,
$c$=speed of light, and
$\delta_1$=distance to be determined.

5. The laser radiation source according to claim 4, wherein the modulation frequency is periodically varied around the signature frequency of $\delta v = \alpha \times c \times \delta_1$.

6. The laser radiation source according to claim 1, wherein the seed laser light is modulated with a periodically varying modulation frequency.

7. The laser radiation source according to claim 1, wherein the means for injection of seed laser light is an injection laser adapted to increase the intensity of the beat signal of the frequency shifted laser emitted frequency components at the object sensor beyond the intensity which can be obtained with spontaneous emission in the resonator of the frequency shifted feedback laser only.

8. The laser radiation source according claim 7, wherein the injection laser injects the non-pumping injection laser light into the gain medium of the frequency shifted feedback laser.

9. The laser radiation source according claim 8, wherein the gain medium of the frequency shifted feedback laser is an optical fiber internal to the resonator and/or constituting the resonator.

10. The laser radiation source according to claim 1, wherein the injection laser is a single mode laser.

11. The laser radiation source according claim 10, wherein the injection laser has a frequency width of less than 5% of the gain of the frequency shifted feedback laser radiation gain medium.

12. A frequency shifted laser radiation source for distance measurements, comprising:
 a frequency shifted feedback laser resonator having a pumped gain medium with a gain greater than unity therein so as to emit frequency shifted laser light changing with time in a chirping manner;
 a means for splitting said emitted frequency shifted laser light changing with time in a chirping manner into an object beam for irradiating an object and a reference beam, the emitted laser radiation being usable for determinations of distances of objects when using an object detection sensor which receives laser light radiation coming back from an object illuminated with the object beam light and being at a distance to be determined and which object detection sensor also receives said reference beam via a reference path not including the object in such a manner that the laser light radiation coming back from the object and the reference beam interfere with one another, said interference producing a beat signal having a given intensity the intensity of said beat signal being representative for the distance of the object so that said distance can be determined in response to the intensity of said beat signal;
 wherein the frequency shifted feedback laser radiation source further comprises a means for injection of narrow banded, non-pumping, modulated seed laser light into the frequency shifted feedback resonator, said means for injection modulates the seed laser light such that said intensity of said beat signal is increased.

13. The laser radiation source according to claim 12, wherein the seed light has a wavelength close to the wavelength where the gain of the pumped gain medium is unity so that amplification of the seed laser light occurs at latest after a few resonator round trips.

14. The laser radiation source according to claim 12, wherein the seed laser light is modulated around a signature frequency of $$\delta\nu = \alpha \times c \times \delta_1,$$

wherein
$\alpha$=chirp rate,
c=speed of light, and
$\delta_1$=distance to be determined.

15. The laser radiation source according to claim 14, wherein the modulation frequency is periodically varied around the signature frequency of $\delta\nu = \alpha \times c \times \delta_1$.

16. The laser radiation source according claim 15, wherein the injection laser has a frequency width of less than 5% of the gain of the frequency shifted feedback laser radiation gain medium.

17. The laser radiation source according claim 14, wherein the injection laser has a frequency width of less than 5% of the gain of the frequency shifted feedback laser radiation gain medium.

18. The laser radiation source according to claim 12, wherein the seed laser light is modulated with a periodically varying frequency.

19. The laser radiation source according claim 18, wherein the injection laser has a frequency width of less than 5% of the gain of the frequency shifted feedback laser radiation gain medium.

20. The laser radiation source according claim 19, wherein the injection laser is a single mode laser.

21. The laser radiation source according claim 20, wherein the gain medium of the frequency shifted feedback laser is an optical fiber internal to the resonator and/or constituting the resonator.

22. The laser radiation source according claim 12, wherein the gain medium of the frequency shifted feedback laser is an optical fiber internal to the resonator and/or constituting the resonator.

23. A frequency shifted laser radiation source for distance measurements, comprising:
a frequency shifted feedback laser resonator having a pumped gain medium therein with a gain greater than unity so as to emit laser light having a plurality of frequency components changing with time in a chirping manner;
a means for splitting said emitted laser light having said plurality of frequency components changing with time in a chirping manner into an object beam for irradiating an object and a reference beam;
the emitted laser radiation being usable for determinations of distances of objects when using an object detection sensor which receives laser light radiation coming back from an object illuminated with the object beam light and being at a distance to be determined and which object detection sensor also receives said reference beam via a reference path not including the object in such a manner that the laser light radiation coming back from the object and the reference beam interfere with one another, said interference producing a signal by the beating of the plurality of frequency components that change with time in a chirping manner and which are comprised in laser light radiation coming back from said object illuminated with the object beam beating with the plurality of frequency components that change with time in a chirping manner and which are further comprised in the reference beam received at the sensor via said reference path not including the object said beat signal having a signal intensity allowing for the determination of the distance of the object in response to the intensity of the signal;
wherein the frequency shifted feedback laser radiation source further comprises a means for injection of narrow banded, non-pumping, modulated seed laser light into the frequency shifted feedback resonator, said means for injection modulating the seed laser light such that said intensity of said beat signal is increased, wherein the seed laser light is phase modulated; and
wherein the means for injection is modulated such that said intensity of said beat signal is increased by modulating the seed laser light such that the seed laser light is modulated around a signature frequency of $$\delta\nu = \alpha \times c \times \delta_1,$$

wherein
$\alpha$=chirp rate,
c=speed of light, and
$\delta_1$=distance to be determined.

24. A frequency shifted laser radiation source for distance measurements, comprising:
a frequency shifted feedback laser resonator having a pumped gain medium with a gain greater than unity therein so as to emit frequency shifted laser light changing with time in a chirping manner;
a means for splitting said emitted frequency shifted laser light changing with time in a chirping manner into an object beam for irradiating an object and a reference beam, the emitted laser radiation being usable for determinations of distances of objects when using an object detection sensor which receives laser light radiation coming back from an object illuminated with the object beam light and being at a distance to be determined and which object detection sensor also receives said reference beam via a reference path not including the object in such a manner that the laser light radiation coming back from the object and the reference beam interfere with one another, said interference producing a beat signal having a given intensity the intensity of said beat signal being representative for the distance of the object so that said distance can be determined in response to the intensity of said beat signal;
wherein the frequency shifted feedback laser radiation source further comprises a means for injection of narrow banded, non-pumping, modulated seed laser light into the frequency shifted feedback resonator, said means for injection modulating the seed laser light such that said intensity of said beat signal is increased;
wherein the seed laser light is modulated around a signature frequency of $$\delta\nu = \alpha \times c \times \delta_1,$$

wherein
$\alpha$=chirp rate,
c=speed of light, and
$\delta_1$=distance to be determined; and
wherein the seed laser light is adapted to vary the modulation frequency periodically linear with time.

* * * * *